(12) United States Patent
Kim

(10) Patent No.: US 11,409,187 B2
(45) Date of Patent: Aug. 9, 2022

(54) EASILY FOLDABLE SOFT BOX

(71) Applicant: Jong Seok Kim, Busan (KR)

(72) Inventor: Jong Seok Kim, Busan (KR)

( * ) Notice: Subject to any disclaimer, the term of this patent is extended or adjusted under 35 U.S.C. 154(b) by 0 days.

(21) Appl. No.: 17/045,953

(22) PCT Filed: Apr. 2, 2020

(86) PCT No.: PCT/KR2020/004524
§ 371 (c)(1),
(2) Date: Oct. 7, 2020

(87) PCT Pub. No.: WO2020/213859
PCT Pub. Date: Oct. 22, 2020

(65) Prior Publication Data
US 2021/0247665 A1    Aug. 12, 2021

(30) Foreign Application Priority Data

Apr. 16, 2019    (KR) .......................... 10-2019-0044038

(51) Int. Cl.
*G03B 15/06*    (2021.01)
(52) U.S. Cl.
CPC .................................... *G03B 15/06* (2013.01)
(58) Field of Classification Search
None
See application file for complete search history.

(56) References Cited

U.S. PATENT DOCUMENTS

2014/0192510 A1*   7/2014   Kim .......................... F21V 7/18
                                                                362/16
2018/0119920 A1*   5/2018   Lin ........................... F21V 1/06

FOREIGN PATENT DOCUMENTS

| KR | 20-0359367 | | 8/2004 |
| KR | 20-0395871 | | 9/2005 |
| KR | 10-2011-0039739 | A | 4/2011 |
| KR | 10-1127458 | B1 | 3/2012 |
| KR | 10-2012-0048155 | A | 5/2012 |
| KR | 10-1254900 | B1 | 4/2013 |
| KR | 10-1706469 | B1 | 2/2017 |

* cited by examiner

*Primary Examiner* — Elmito Breval
(74) *Attorney, Agent, or Firm* — IP Legal Services, LLC

(57) ABSTRACT

The present disclosure relates to an easily foldable soft box, a lighting device that softens and spread light over a wide area, that comes with a diffuser (diffusing cover) that can fold easily with one touch, making it easy to collapse (and expand) the device. The easily foldable soft box comprises: a speed ring having the shape of a ring that allows a light-producing device to be mounted at an opening in the center, whose front part is configured to fold in half or unfold; a plurality of ribs attached to the front part, that are arranged in a radiating pattern around the speed ring when the front part is unfolded, and that are gathered together as the ribs arranged within one range overlap the ribs arranged within another range when the front part is folded in half; and a diffuser that unfolds like an umbrella to diffuse light produced by the light-producing device when the ribs are arranged in a radiating pattern, and that is folded by the ribs when the front part is folded.

6 Claims, 12 Drawing Sheets

A : 1, 2, 3

EASILY FOLDABLE SOFT BOX

CROSS REFERENCE TO RELATED APPLICATIONS

This application is a National Stage Patent Application of PCT International Patent Application No. PCT/KR2020/004524 (filed on Apr. 2, 2020) under 35 U.S.C. § 371, which claims priority to Korean Patent Application No. 10-2019-0044038 (filed on Apr. 16, 2019), the teachings of which are incorporated herein in their entireties by reference.

TECHNICAL FIELD

The present disclosure relates to an easily foldable soft box, and more particularly, to an easily foldable box, a lighting device that softens and spread light over a wide area, that comes with a diffuser (diffusing cover) that can fold easily with one touch, making it easy to collapse (and expand) the device.

BACKGROUND ART

With the high-tech innovation and digitalization of cameras and the remarkable developments in image signal processing technologies, photographic qualities (such as pixels, chromaticity, brightness, etc.) are getting more and more advanced. On top of that, various methods have been developed and employed in technologies for shooting continuous bursts and moments.

The most important and fundamental thing in photography is light shining on a photographic target (object). Light is an element that absolutely affects the quality of captured images (photographs or the like). The main source of this light is the sun, and the basics of all of this is the dependence on the solar light source.

However, if there is a lack of light or a distortion of colors due to the surrounding environment, artificial light sources may be used. To this end, a light-producing device called a speedlight (also referred to as an "electronic flash" or "strobe") is used in most photography situations.

Some of the advantages of using the speedlight are that it provides proper exposure for photographs even with a small amount of light, as mentioned earlier, and that it gives the camera a shutter speed for taking pictures without hand shakiness under low-light circumstances. The speedlight is viewed as necessary to get good, natural-looking photographs when there is a lack of natural light (sunlight), and actually most single-lens reflex (SLR) camera users own it.

But, even with these benefits, the extremely high density of light produced by a light-producing part, paired with its narrow area, may lead to the problem of captured image distortion such as highly inconsistent tones and hard shadows when the speedlight directly illuminates an object. To minimize this, bounce lighting is often used which bounces light off a ceiling or the like to indirectly illuminate the object.

However, the aforementioned bounce lighting necessitates a reflector (e.g., ceiling), and may be useless because the distance the light from the speedlight has to travel to reach an object is long in a space where the reflector is positioned high.

In view of this, a soft box is being used nowadays which diffuses light from the speedlight to soften and even out the lighting and spread it over a wide area.

In relation to this, Korean Utility Model Registration No. 20-0395871 discloses a multipurpose speed ring for a soft box for photography that enhances the functionality and photographic effects of the soft box, enables the soft box to be quickly attached and detached, and makes it easy to carry around.

In addition, Korean Utility Model Registration No. 20-0359367 discloses a speed ring for a soft box that enhances the functionality of a soft box for photography, enables the soft box to be quickly attached and detached, and makes it easy to carry around.

However, the conventional multipurpose speed ring for a soft box for photography has a high likelihood of loss of parts since the soft box is constructed separately from a tension bar, and also the soft box cannot be collapsed because there are difficulties in assembling and dissembling it, thus significantly reducing portability and making it quite inconvenient for storage.

The conventional speed ring for a soft box allows a fixing bolt to be held in place by a key slot while maintaining the structure of the soft box in a desired shape. This involves repeated fastening and releasing of the fixing bolt, which leads to low durability due to abrasion of the fixing bolt and increases the possibility of loss when the fixing bolt is released.

As a consequence, there is an urgent need for research and development of soft boxes that can be collapsed in such a way as to allow for easy portability and storage by folding a diffuser (diffusing cover) like an umbrella and can make the folding process more convenient.

DETAILED DESCRIPTION OF THE INVENTION

Technical Problem

An aspect of the present disclosure is to solve the above-mentioned problems and provide an easily foldable soft box that achieves a hinge structure in which a front part of a speed ring folds in half and unfolds, with a plurality of ribs being attached to the front part and serving as means for keeping the shape of a diffuser, and that allows the ribs to easily fold and unfold by the hinged movement of the speed ring and makes it easy to collapse or expand the device by this configuration.

Technical Solution

The present disclosure provides an easily foldable soft box comprising: a speed ring having the shape of a ring that allows a light-producing device to be mounted at an opening in the center, whose front part is configured to fold in half or unfold; a plurality of ribs attached to the front part, that are arranged in a radiating pattern around the speed ring when the front part is unfolded, and that are gathered together as the ribs arranged within one range overlap the ribs arranged within another range when the front part is folded in half; and a diffuser that unfolds like an umbrella to diffuse light produced by the light-producing device when the ribs are arranged in a radiating pattern, and that is folded by the ribs when the front part is folded.

Effects of the Invention

As is clear from the above description, the easily foldable soft box of the present disclosure achieves a hinge structure in which the front part of the speed ring folds in half and unfolds, as well as enabling mounting of the light-producing device (speedlight or the like). Thus, when the front part of the speed ring is folded in half, the diffuser unfolded by the ribs can be folded by overlapping the ribs within one range and the ribs within another range and gathering the overlapping ribs 2 together. Therefore, it becomes easier to collapse the device (soft box) for easy portability and storage.

Moreover, as described above, once the ribs are gathered together by overlapping them, the ribs are firmly attached to contact surfaces on one side (second contact surfaces) of assembly holes (first and second assembly holes) for rotating the ribs on a hinge and therefore become parallel to each other in the same direction, thereby bringing the diffuser into the best folded position.

Along with this, the present disclosure is very useful because the above-described effects allow for easy portability and storage of the device (soft box), and, at the same time, contribute to satisfying the user's needs for quick and easy photography and for obtaining the best-quality photographs in short-time photography.

BRIEF DESCRIPTION OF THE DRAWINGS

FIGS. 6A to 8 are exemplary views showing an operation of a speed ring and an operation process of ribs, in an easily foldable soft box according to the present disclosure.

BEST MODE FOR CARRYING OUT THE INVENTION

Figure 1:
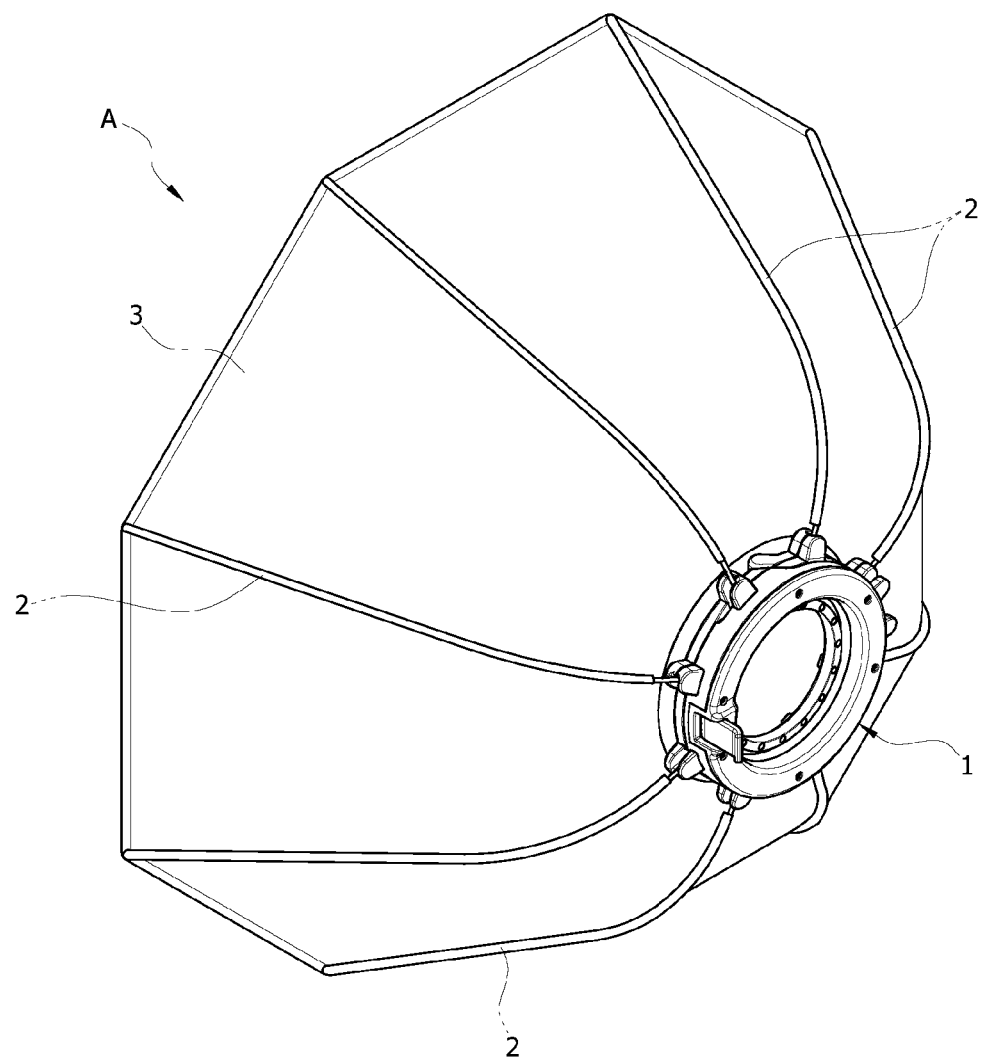
FIG. 1 is a rear perspective view showing an entire structure of an easily foldable soft box according to the present disclosure.

To accomplish the above aspects, one exemplary embodiment of the present disclosure provides an easily foldable soft box comprising: a speed ring having the shape of a ring that allows a light-producing device to be mounted at an opening in the center, whose front part is configured to fold in half or unfold; a plurality of ribs attached to the front part, that are arranged in a radiating pattern around the speed ring when the front part is unfolded, and that are gathered together as the ribs arranged within one range overlap the ribs arranged within another range when the front part is folded in half; and a diffuser that unfolds like an umbrella to diffuse light produced by the light-producing device when the ribs are arranged in a radiating pattern, and that is folded by the ribs when the front part is folded.

Furthermore, the speed ring may comprise: a ring-shaped main frame; an arc-shaped stationary frame attached and fixed to one side of the front of the main frame with respect to the center of the main frame; and a rotational frame capable of rotation, disposed on the other side of the front of the main frame with respect to the center of the main frame and hinged to the stationary frame, so as to form a ring shape in conjunction with the stationary frame by being unfolded and firmly secured to the front of the main frame or so as to overlap the stationary frame by being firmly secured to the front of the stationary frame.

In addition, the main frame may comprise a plurality of first assembly holes formed at regular intervals, for fitting one end of the ribs within one range where the stationary frame is attached, and a plurality of (1-1)th supporting projections formed at regular intervals, for supporting one side of the ribs, protruding from the edges where the first assembly holes are positioned, the stationary frame may comprise axial coupling portions formed on opposite ends for attaching the rotational frame by a hinge, with inward-facing axial holes formed at the center of the axial coupling portions, and further comprises a plurality of (1-2)th supporting projections that protrude at regular intervals from the edge surface and prevent the ribs from falling out by being firmly secured to the corresponding (1-1)th supporting projections, and the rotational frame may comprise hinge parts formed on opposite ends that overlap the axial coupling portions, with axial protrusions protruding from ends of the hinge parts to be inserted into the axial holes and form a hinge point, and further comprises a plurality of second assembly holes formed for fitting one end of the ribs, and a plurality of second supporting projections formed at regular intervals to support one side of the ribs, protruding from the edges where the second assembly holes are positioned.

Furthermore, a plurality of hangers for hanging a rubber band attached to the diffuser may protrude at predetermined intervals along the inner edges of the stationary frame and rotational frame.

In addition, rotation spaces may be formed inside the (1-1)th supporting projections and second supporting protrusions, where the ribs fitted to the first assembly holes and second assembly holes rotate on a hinge.

In addition, first contact surfaces, with which the ribs make tight contact when the ribs are unfolded in a radiating pattern, and second contact surfaces, with which the ribs make contact while keeping themselves parallel to each other when the ribs are gathered together, may be formed on opposite sides of the rotation spaces.

Furthermore, the first contact surfaces may be at a given angle where the ribs are kept unfolded in a radiating pattern, and the second contact surfaces may be at an angle parallel to a centerline drawn horizontally across the center of the main frame.

MODE FOR INVENTION

Hereinafter, exemplary embodiments of the present disclosure will be described with reference to the accompanying drawings so that a person skilled in the art can readily carry out the present disclosure.

Regarding the reference numerals assigned to the elements in the drawings, it should be noted that the same elements will be designated by the same reference numerals, wherever possible, even though they are shown in different drawings. In describing the present disclosure, a detailed description of known functions or configurations related to the present disclosure will be omitted when it is deemed that they may unnecessarily obscure the subject matter of the present disclosure.

Figure 2:
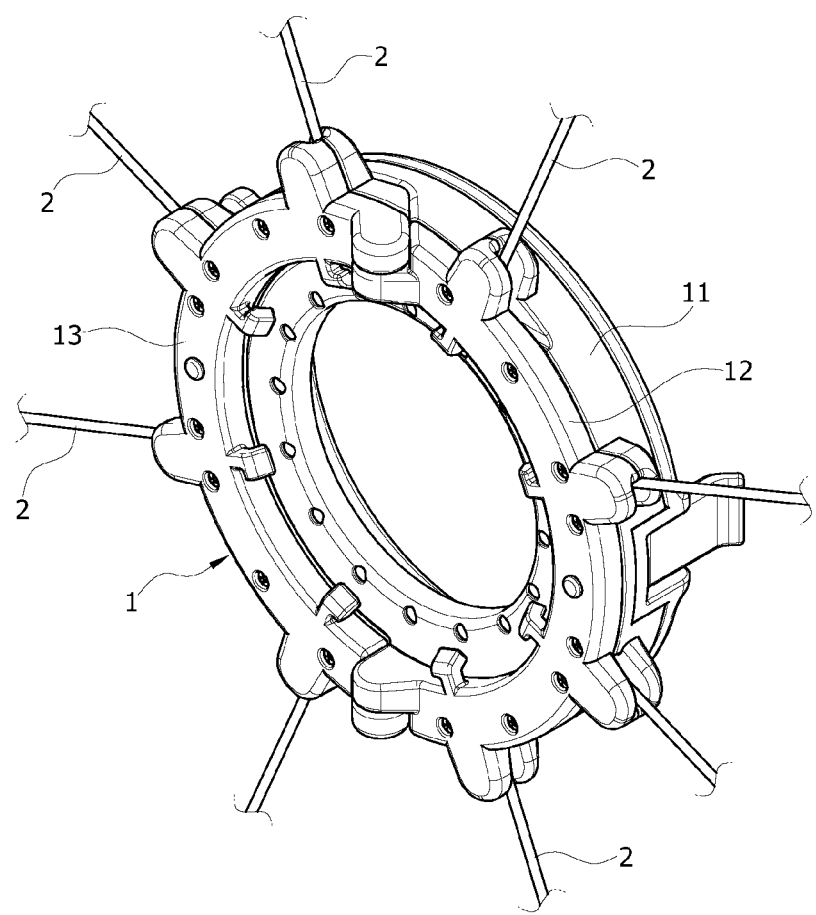
FIG. 2 is a perspective view of essential parts of an easily foldable soft box according to the present disclosure, showing a connection structure between a speed ring and ribs.
Figure 3:
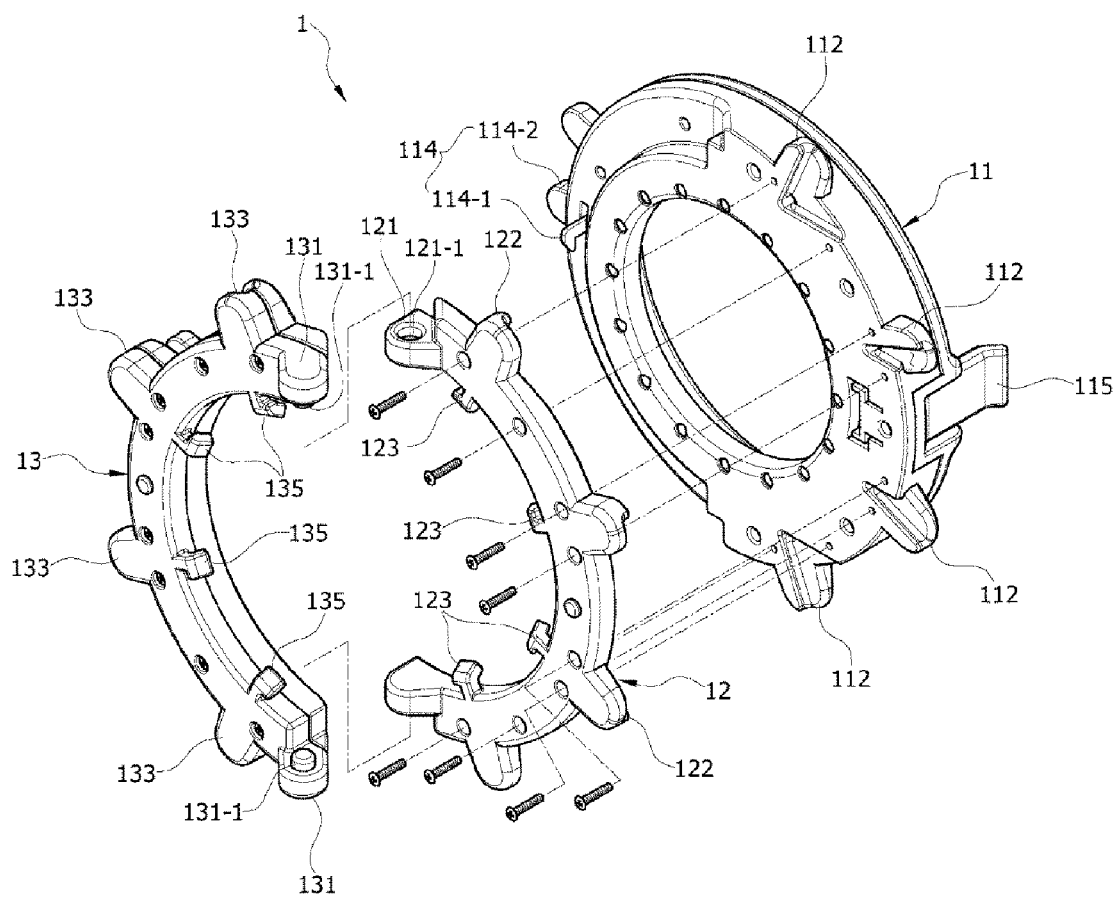
FIG. 3 is an exploded perspective view showing a configuration of a speed ring in an easily foldable soft box according to the present disclosure.
Figure 4A:
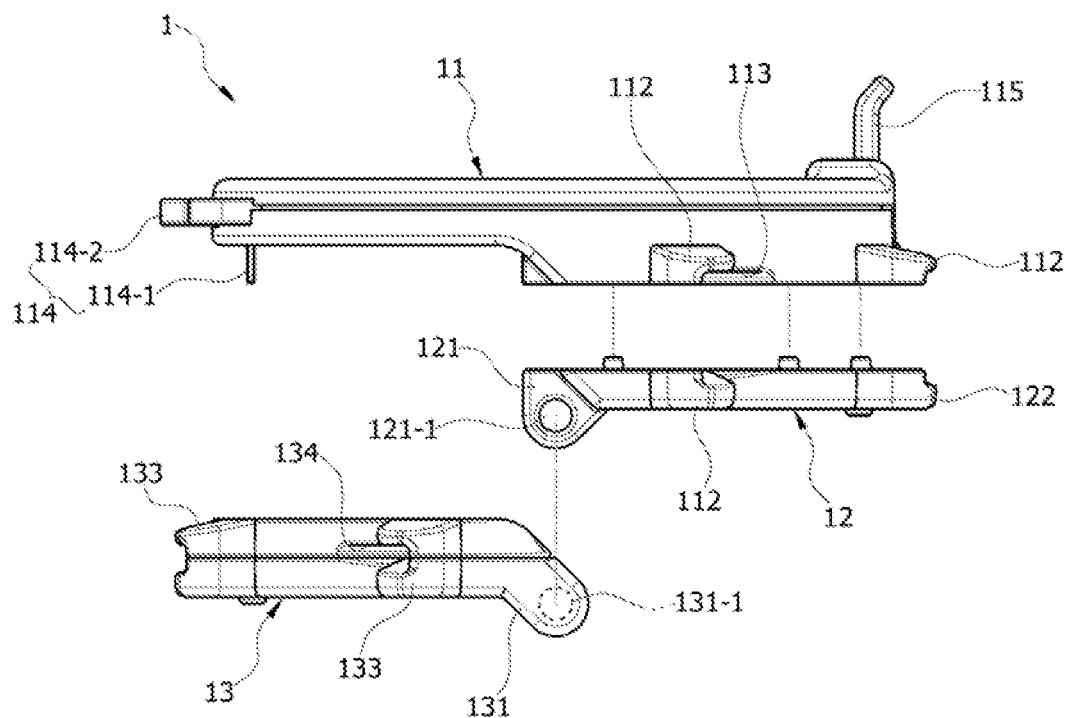
FIGS. 4A and 4B are exemplary views showing how the speed ring is connected.
Figure 4B:
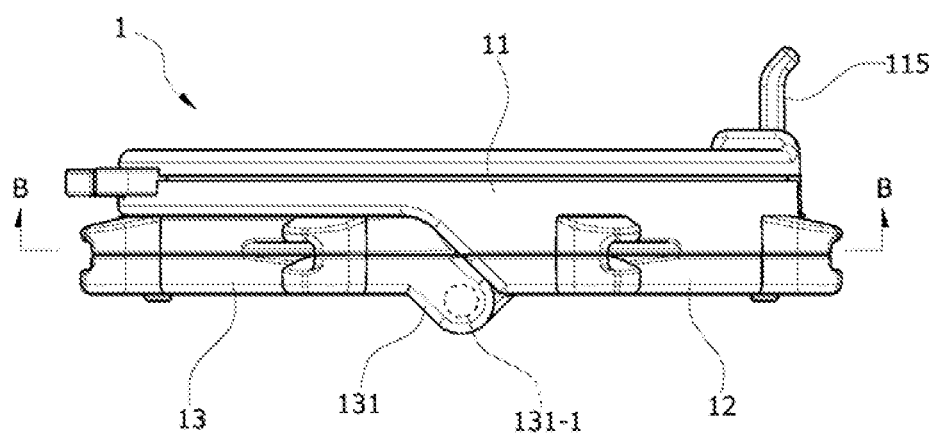
Figure 5:
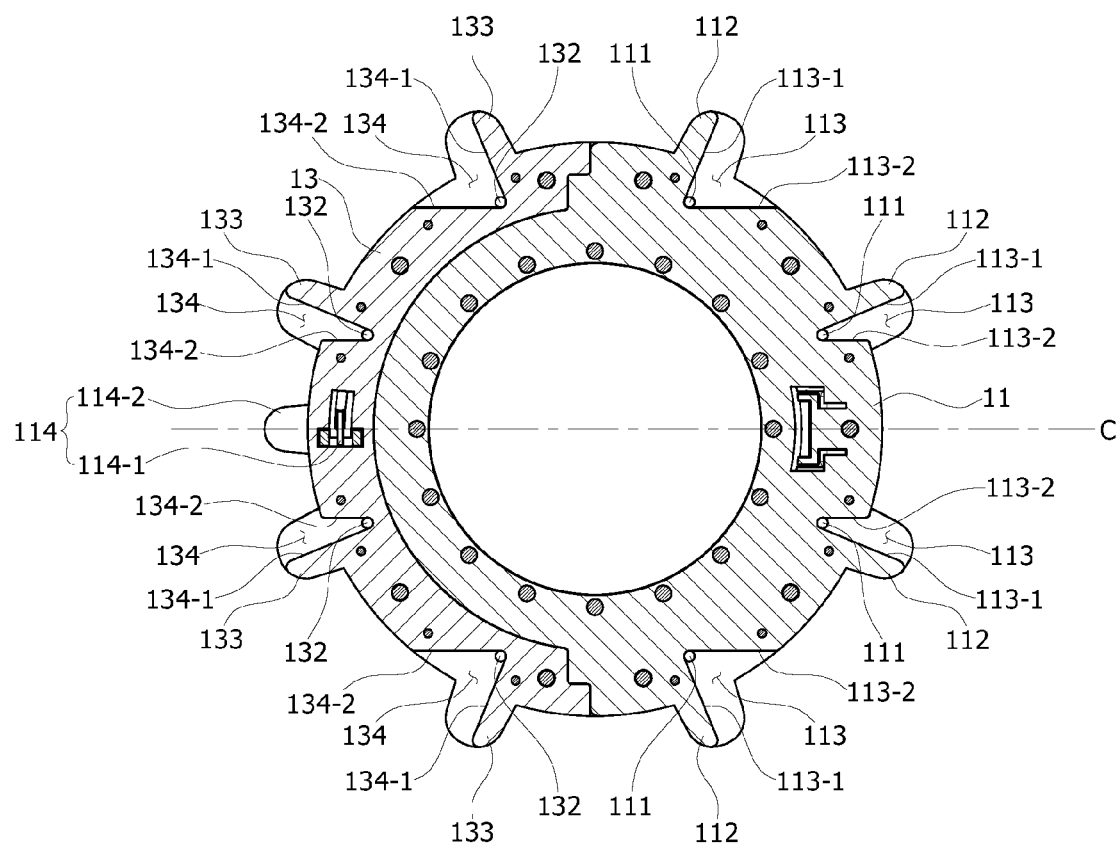
FIG. 5 is a cross-sectional view showing an internal structure of a speed ring, taken along the line B-B of FIG. 4B, in an easily foldable soft box according to the present disclosure.
Figure 6:
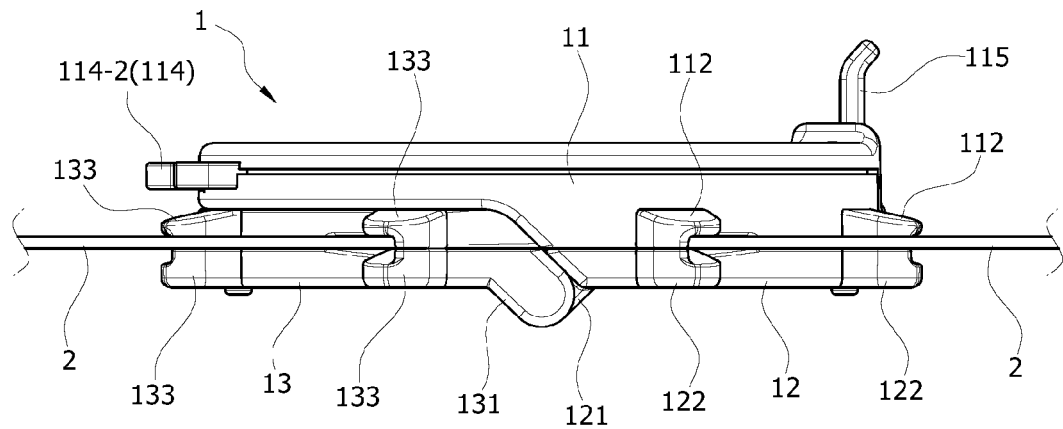
Figure 7:
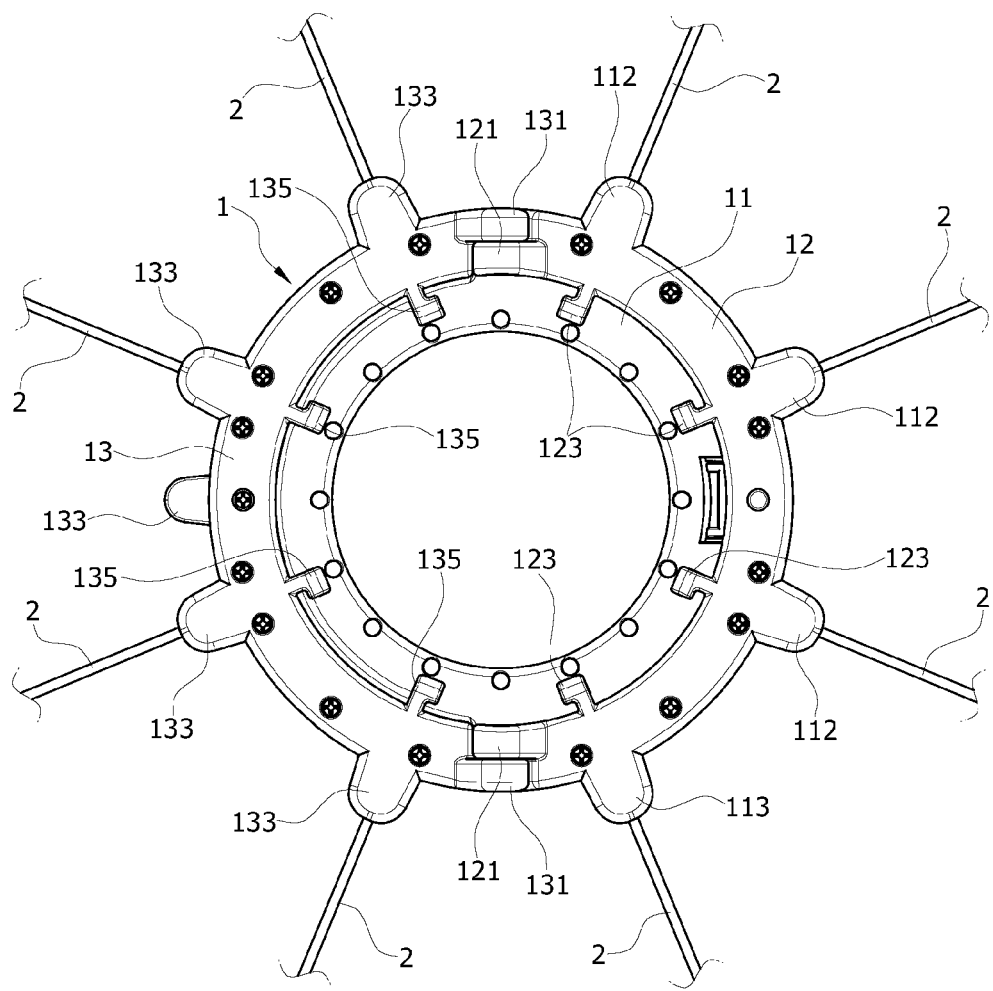
Figure 8:
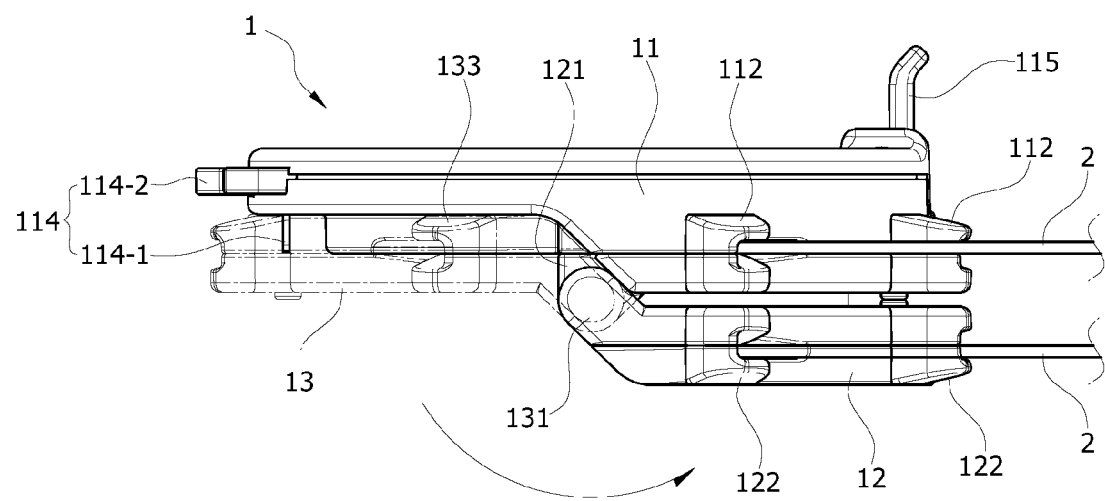
Figure 9:
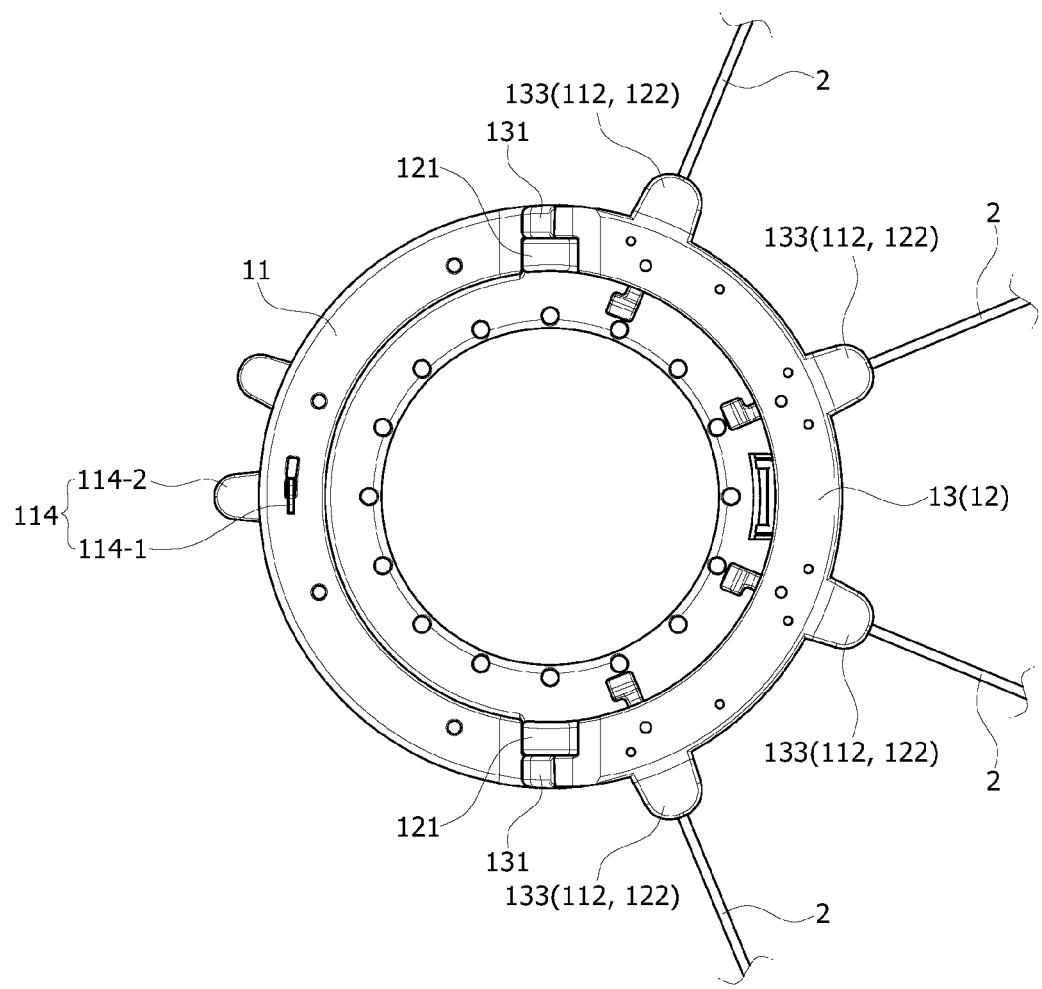
FIGS. 9A and 9B are exemplary cross-sectional views showing an operation of ribs in an easily foldable soft box according to the present disclosure.
Figure 10:
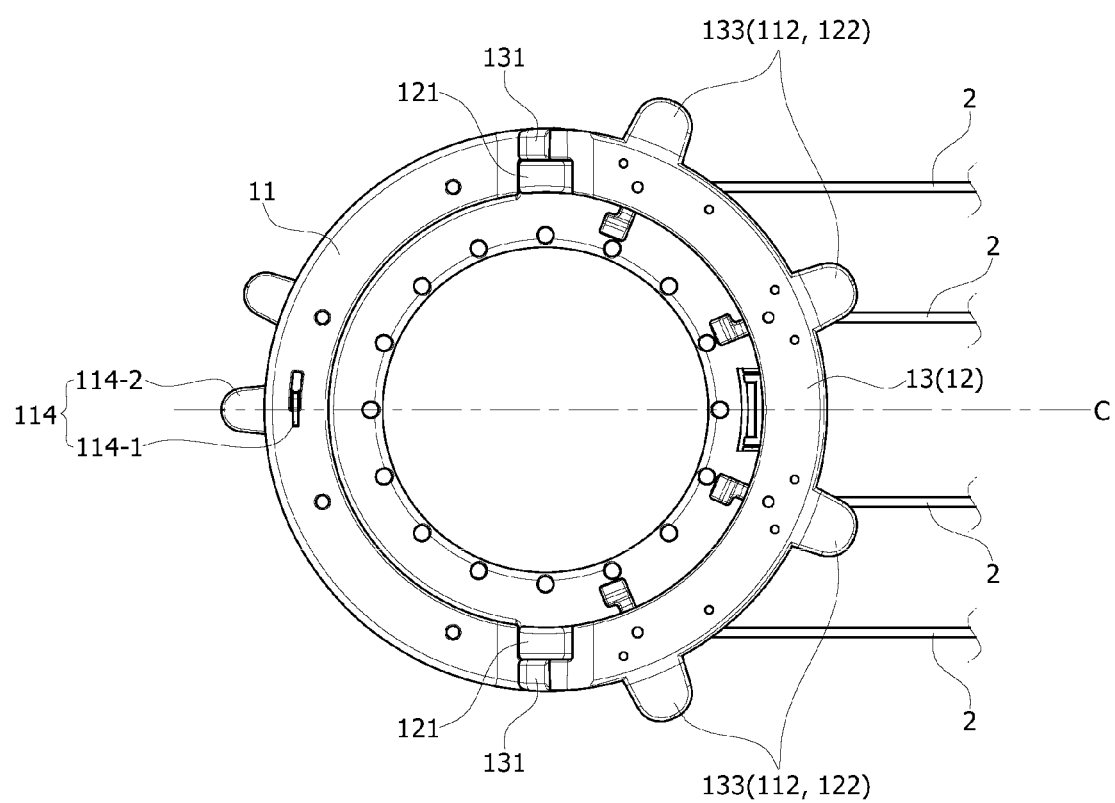
FIG. 10 is a view showing an example of implementation of a diffuser in a folded position in an easily foldable soft box according to the present disclosure.
Figure 11:
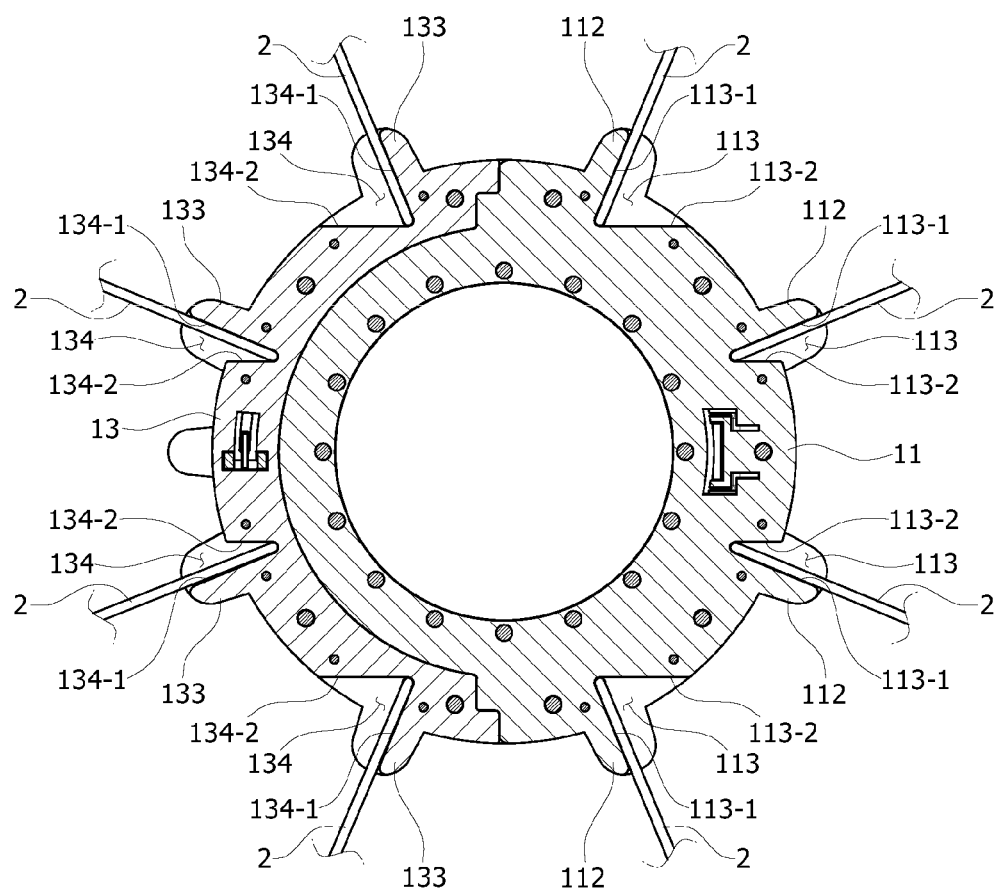
FIG. 11 is a usage view showing an implementation of an easily foldable soft box according to the present disclosure.
Figure 12:
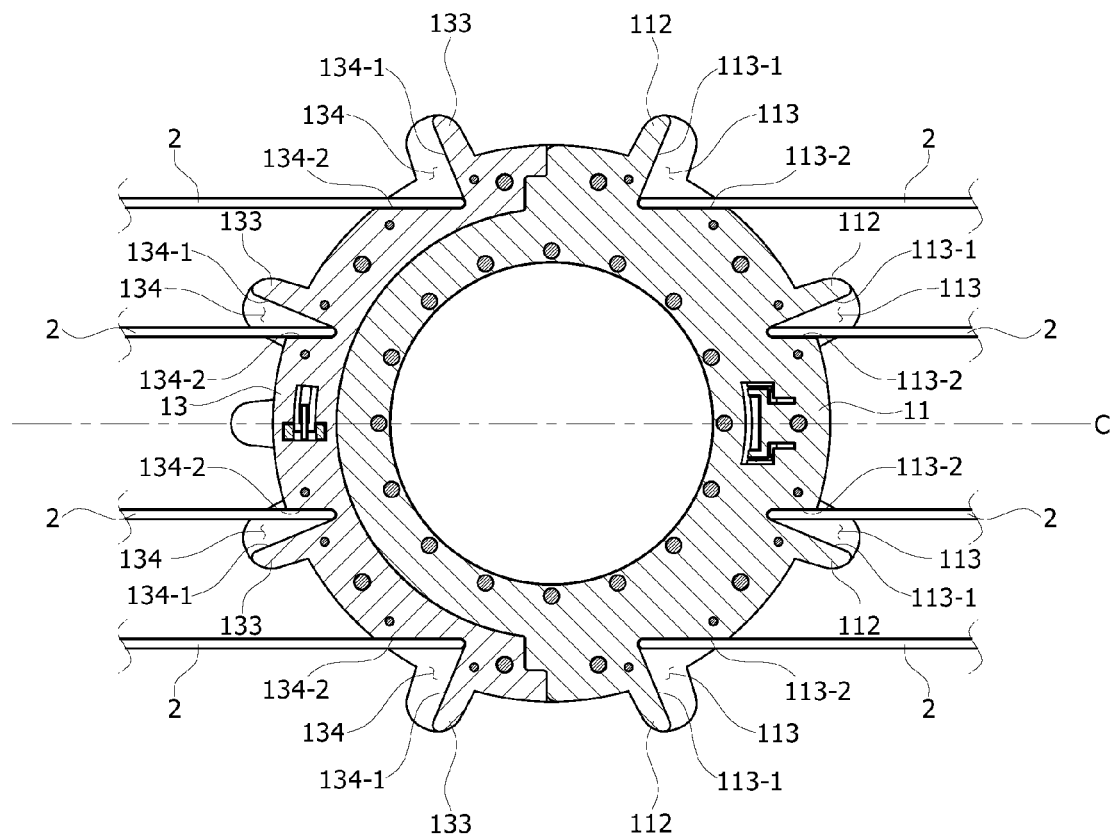
Figure 13:
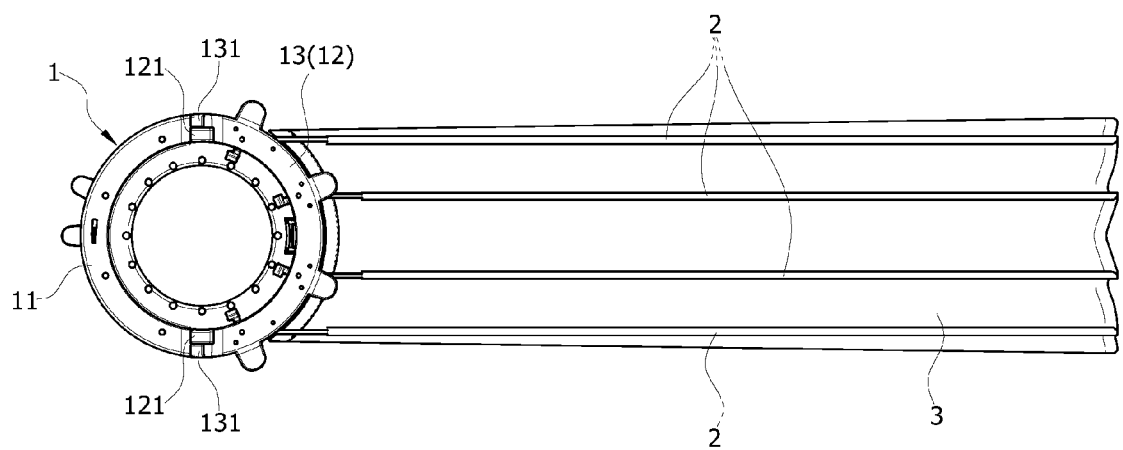
Figure 14:
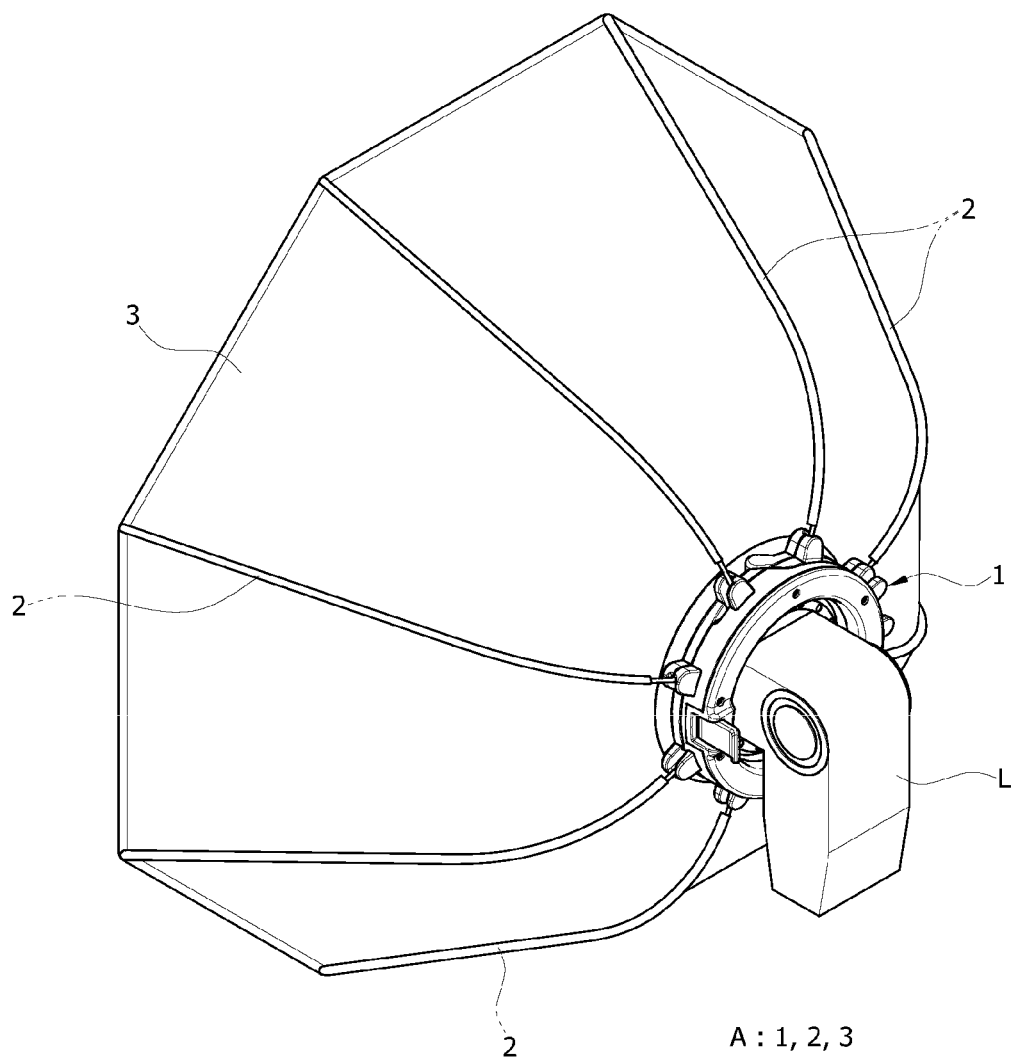

Of the attached drawings, FIG. 1 is a rear perspective view showing an entire structure of an easily foldable soft box according to the present disclosure, FIG. 2 is a perspective view of essential parts of an easily foldable soft box according to the present disclosure, showing a connection structure between a speed ring and ribs, FIG. 3 is an exploded perspective view showing a configuration of a speed ring in an easily foldable soft box according to the present disclosure, and FIGS. 4A and 4B are exemplary views showing how the speed ring is connected, FIG. 5 is a cross-sectional view showing an internal structure of a speed ring, taken along the line B-B of FIG. 4B, in an easily foldable soft box according to the present disclosure, FIGS. 6A to 8 are exemplary views showing an operation of a speed ring and an operation process of ribs, in an easily foldable soft box according to the present disclosure, FIGS. 9A and 9B are exemplary cross-sectional views showing an operation of ribs in an easily foldable soft box according to the present disclosure, FIG. 10 is a view showing an example of implementation of a diffuser in a folded position in an easily foldable soft box according to the present disclosure, and FIG. 11 is a usage view showing an implementation of an easily foldable soft box according to the present disclosure.

As illustrated in FIGS. 1 and 2, the easily foldable soft box A according to the present disclosure comprises: a speed ring 1 having the shape of a ring that allows a light-producing device to be mounted at an opening in the center, whose front part is configured to fold in half or unfold; a plurality of ribs 2 attached to the front part, that are arranged in a radiating pattern around the speed ring 1 when the front part is unfolded, and that are gathered together as the ribs arranged within one range overlap the ribs arranged within another range when the front part is folded in half; and a diffuser 3 that unfolds like an umbrella to diffuse light produced by the light-producing device when the ribs are arranged in a radiating pattern, and that is folded by the ribs 2 when the front part is folded.

The speed ring 1 is a base structure for mounting a light-producing device (speedlight or the like), arranging the ribs 2 in a radiating pattern, and gathering them together. As illustrated in FIGS. 3 to 5, the speed ring 1 comprises: a ring-shaped main frame 11 with an opening in the center for fitting the light-producing device; an arc-shaped stationary frame 12 attached and fixed to one side of the front of the main frame 11 with respect to the center of the main frame 11; and a rotational frame 13 capable of rotation, disposed on the other side of the front of the main frame 11 with respect to the center of the main frame 11 and hinged to the stationary frame 12, so as to form a ring shape in conjunction with the stationary frame 12 by being unfolded and firmly secured to the front of the main frame 11 or so as to overlap the stationary frame 12 by being firmly secured to the front of the stationary frame 12.

The main frame 11 comprises a plurality of first assembly holes 111 formed at regular intervals, for fitting one end of the ribs 2 within one range where the stationary frame 12 is attached, and a plurality of (1-1)th supporting projections 112 formed at regular intervals, for supporting one side of the ribs 2, protruding from the edges where the first assembly holes 111 are positioned.

Moreover, rotation spaces 113 are formed inside the (1-1)th supporting projections 112, where the ribs 2 fitted to the first assembly holes 111 are unfolded in a radiating pattern or gathered together by rotating on a hinge. As illustrated in FIG. 5, first contact surfaces 113-1, with which the ribs 2 make tight contact when the ribs 2 are unfolded in a radiating pattern, and second contact surfaces 113-2, with which the ribs 2 make contact while keeping themselves parallel to each other when the ribs 2 are gathered together, are formed on opposite sides of the rotation spaces 113.

Here, the first contact surfaces 113-1 are at a given angle where the ribs 2 are kept unfolded in a radiating pattern, and the second contact surfaces 113-2 are at an angle parallel to a centerline C drawn horizontally across the center of the main frame 11.

Furthermore, a locking member 114 is provided which locks (or unlocks) the rotational frame 13 to keep it secured when the rotational frame 13 is unfolded and firmly secured to the front of the main frame 11.

Here, the locking member 114 comprises an engaging hook 114-1 inserted and fastened to a rear fastening groove (not shown) of the rotational frame 13 firmly attached to the main frame 11, for preventing rotation of the rotational frame 13, and an operating lever 114-2 that unlocks the rotational frame 13 by operating the engaging hook 114-1.

The stationary frame 12 comprises axial coupling portions 121 formed on opposite ends for attaching the rotational frame 13 by a hinge, with inward-facing axial holes 121-1 formed at the center of the axial coupling portions 121 so that axial protrusions formed on hinge parts of the rotational frame 13 to be described later are fitted to them.

In addition, the stationary frame 12 further comprises a plurality of (1-2)th supporting projections 122 that protrude at regular intervals from the edge surface and prevent the ribs 2 from falling out by being firmly secured to the corresponding (1-1)th supporting projections 112.

In addition, a plurality of hangers 123 for hanging a rubber band (not shown) attached to the diffuser 3 protrude at predetermined intervals along the inner edge.

The rotational frame 13 comprises hinge parts 131 formed on opposite ends that overlap the axial coupling portions 121 of the stationary frame 12, with axial protrusions 131-1 protruding from ends of the hinge parts 131 to be inserted into the axial holes 121-1 and form a hinge point.

The rotational frame 13 further comprises a plurality of second assembly holes 132 formed for fitting one end of the ribs 2, and a plurality of second supporting projections 133 formed at regular intervals to support one side of the ribs 2, protruding from the edges where the second assembly holes 132 are positioned.

Moreover, rotation spaces 134 are formed inside the second supporting projections 133, where the ribs 2 fitted to the second assembly holes 132 are unfolded in a radiating pattern or gathered together by rotating on a hinge. As illustrated in FIG. 5, first contact surfaces 134-1, with which the ribs 2 make tight contact when the ribs 2 are unfolded in a radiating pattern, and second contact surfaces 134-2, with which the ribs 2 make contact while keeping themselves parallel to each other when the ribs 2 are gathered together, are formed on opposite sides of the rotation spaces 134.

Here, the first contact surfaces 134-1 are at a given angle where the ribs 2 are kept unfolded in a radiating pattern, and the second contact surfaces 134-2 are at an angle parallel to a centerline C drawn horizontally across the center of the main frame 11.

In addition, a plurality of hangers 135 for hanging a rubber band (not shown) attached to the diffuser 3 protrude at predetermined intervals along the inner edge.

The ribs 2 serve as a framework for maintaining the shape of the diffuser 3, preferably, elastic rods that can represent a tension for forming a bend corresponding to a three-dimensional shape of the diffuser 3.

The diffuser 3 is used to diffuse light produced by the light-producing device.

The diffuser 3 has a flare-shape structure which forms a polygonal shape when viewed from the front when it is kept unfolded like an umbrella by the ribs 2, and which is narrow in area in a rear part where the speed ring 1 is positioned and becomes wider toward the front when viewed from the side. Also, the diffuser 3 is configured in such a manner that blocks the front side of a diffuser curtain (not shown) that diffuses light produced by the light-producing device.

Unexplained reference numeral 115 denotes a constraining member that is required to keep a light-producing device such as a speedlight fastened, the light-producing device being mounted to the main frame of the speed ring while added and attached to the main frame, and L denotes a light-producing device used to produce light from an artificial light source such as a speedlight.

Thus configured, the operation of the easily foldable soft box A according to the present disclosure will be described below in concrete details.

First of all, as illustrated in FIG. 11, the easily foldable soft box A according to the present disclosure is mounted and used on a light-producing device L (speedlight) to prevent produced light from directly illuminating a photographic target (object), which is one of the causes of captured image distortion such as inconsistent tones and hard shadows on the object.

To this end, the diffuser 3 is unfolded into an umbrella-like, three-dimensional shape, and then the light-producing device L is mounted at the opening in the center of the speed ring 1 at the back of the diffuser 3. Thus, light produced by the light-producing device L is softened and spread over a wide area by the diffuser curtain provided on the front side of the diffuser 3, thereby obtaining natural-looking results (photographs) when capturing images.

Here, the process of unfolding the diffuser 3 into a three-dimensional shape is enabled as follows: the rotational frame 13, which overlaps and is firmly attached to the stationary frame 12 fixed and attached to one side of the front of the main frame 11 of the speed ring 1, is rotated so that the rotational frame 13 is firmly secured to the other side of the front of the main frame 11 and, therefore, the ribs 2 whose bent ends are fitted to the first and second assembly holes 111 and 132 of the main frame 11 and rotational frame 13 are unfolded in a radiating pattern, corresponding to the three-dimensional shape of the diffuser 3.

Afterwards, the soft box A of the present disclosure may be collapsed for easy portability and storage after capturing images. First of all, the speedlight L is removed from the soft box A of the present disclosure.

Next, as illustrated in FIGS. 6A and 6B, the diffuser 3 can be folded by gathering together the ribs 2 unfolded in a radiating pattern.

Specifically, the rotational frame 13 locked by the engaging hook 114-1 of the locking member 114 is unlocked by using (operating) the operating lever 114-2 of the locking member 114. Then, as illustrated in FIGS. 7A and 7B, the rotational frame 13 firmly secured to the front of the main frame 11 is rotated so as to be firmly secured to the stationary frame 12, so that the ribs 2 fitted to the first assembly holes 111 of the main frame 11 and unfolded in a radiating pattern and the ribs 2 fitted to the second assembly holes 132 of the rotational frame 13 and unfolded in a radiating pattern overlap each other.

Next, the diffuser 3 may be folded into the smallest size possible by gathering the above-mentioned overlapping ribs 2 together by rotating them, whereby the device can be collapsed.

Here, the above process of gathering the ribs 2 together is enabled as follows: the rotation spaces 113 and 134 are formed inside the (1-1)th supporting projections 112 and second supporting projections 133 of the main frame 11 and rotational frame 13, where the first and second assembly holes 111 and 132 are positioned, and the ribs 2 firmly attached to the first contact surfaces 113-1 and 134-1 are rotated so that the ribs 2 are firmly attached to the second contact surfaces 113-2 and 134-2 parallel to each other and, therefore, the ribs 2 also become parallel to each other, as illustrated in FIG. 8.

In other words, the ribs 2 can be gathered together by bringing the ribs 2 unfolded in a radiating pattern as in FIG. 9A parallel to each other as in FIG. 9B. This allows for easy folding of the diffuser 3, and makes it quite easy to carry and store the soft box A, as well as collapsing the soft box A by folding the diffuser 3, as illustrated in FIG. 10.

To sum up, the easily foldable soft box A of the present disclosure can achieve a structural improvement of the speed ring 1 whose front part folds in half or unfolds, as well as enabling mounting of the light-producing device L, and this allows the ribs 2 assembled to the main frame 11 and rotational frame 13 of the speed ring 1 to overlap each other by folding the front part of the speed ring 1 (by folding the rotational frame 13), and also enables folding of the diffuser 3 whose shape is maintained by the ribs 2 by gathering the overlapping ribs 2 together. Therefore, it becomes easier to collapse the device (soft box) for easy portability and storage.

The easily foldable soft box A of the present disclosure can achieve a hinge structure in which the front part of the speed ring 1 folds in half and unfolds, as well as enabling mounting of the light-producing device L. Thus, when the front part of the speed ring 1 is folded in half, the diffuser 3 unfolded by all the ribs 2 can be folded by overlapping the ribs 2 within one range, i.e., the ribs 2 attached to the rotational frame 13, and the ribs 2 within another range, i.e., the ribs 2 attached to the stationary frame 12, and gathering the overlapping ribs 2 together. Therefore, it becomes easier to collapse the soft box A for easy portability and storage.

Once the ribs 2 are gathered together by overlapping them, the ribs 2 are firmly attached to the second contact surfaces 113-1 and 134-2 of the first and second assembly holes 111 and 132 for attaching and rotating the ribs 2 and therefore become parallel to each other in the same direction, thereby bringing the diffuser 3 into the best folded position.

The forgoing descriptions are mere illustration of the technical idea of the present disclosure. A person having an ordinary knowledge in the technical field to which the present disclosure pertains will be able to make modifications, changes and substitutions without departing from the essential features of the disclosure. Accordingly, the embodiments and the accompanying drawings disclosed herein are not intended to limit the technical concept of the present disclosure but are intended to describe the present disclosure. The technical concept of the present disclosure shall not be limited by the embodiments and the accompanying drawings. The protection scope of the present disclosure shall be construed on the basis of the appended claims. All the technical concepts which are equivalent in scope to the claims shall be construed to fall within the scope of the present disclosure.

INDUSTRIAL APPLICABILITY

The present disclosure may be used in lighting devices that diffuse light.

The invention claimed is:

1. An easily foldable soft box comprising:
   a speed ring having the shape of a ring that allows a light-producing device to be mounted at an opening in the center, whose front part is configured to fold in half or unfold;
   a plurality of ribs attached to the front part, that are arranged in a radiating pattern around the speed ring when the front part is unfolded, and that are gathered together as the ribs arranged within one range overlap the ribs arranged within another range when the front part is folded in half; and
   a diffuser that unfolds like an umbrella to diffuse light produced by the light-producing device when the ribs are arranged in a radiating pattern, and that is folded by the ribs when the front part is folded,
   wherein the main frame comprises a plurality of first assembly holes formed at regular intervals, for fitting one end of the ribs within one range where the stationary frame is attached, and a plurality of (1-1)th supporting projections formed at regular intervals, for supporting one side of the ribs, protruding from the edges where the first assembly holes are positioned,
   the stationary frame comprises axial coupling portions formed on opposite ends for attaching the rotational frame by a hinge, with inward-facing axial holes formed at the center of the axial coupling portions, and further comprises a plurality of (1-2)th supporting projections that protrude at regular intervals from the edge surface and prevent the ribs from falling out by being firmly secured to the corresponding (1-1)th supporting projections, and
   the rotational frame comprises hinge parts formed on opposite ends that overlap the axial coupling portions, with axial protrusions protruding from ends of the hinge parts to be inserted into the axial holes and form a hinge point, and further comprises a plurality of second assembly holes formed for fitting one end of the ribs, and a plurality of second supporting projections formed at regular intervals to support one side of the ribs, protruding from the edges where the second assembly holes are positioned.

2. The easily foldable soft box of claim 1, wherein the speed ring comprises:
   a ring-shaped main frame;
   an arc-shaped stationary frame attached and fixed to one side of the front of the main frame with respect to the center of the main frame; and
   a rotational frame capable of rotation, disposed on the other side of the front of the main frame with respect to the center of the main frame and hinged to the stationary frame, so as to form a ring shape in conjunction with the stationary frame by being unfolded and firmly secured to the front of the main frame or so as to overlap the stationary frame by being firmly secured to the front of the stationary frame.

3. The easily foldable soft box of claim 2, wherein a plurality of hangers for hanging a rubber band attached to the diffuser protrude at predetermined intervals along the inner edges of the stationary frame and rotational frame.

4. The easily foldable soft box of claim 1, wherein rotation spaces are formed inside the (1-1)th supporting projections and second supporting protrusions, where the ribs fitted to the first assembly holes and second assembly holes rotate on a hinge.

5. The easily foldable soft box of claim 4, wherein first contact surfaces, with which the ribs make tight contact when the ribs are unfolded in a radiating pattern, and second contact surfaces, with which the ribs make contact while keeping themselves parallel to each other when the ribs are gathered together, are formed on opposite sides of the rotation spaces.

6. The easily foldable soft box of claim 5, wherein the first contact surfaces are at a given angle where the ribs are kept unfolded in a radiating pattern, and the second contact surfaces are at an angle parallel to a centerline drawn horizontally across the center of the main frame.

* * * * *